United States Patent
Tsuchida

(10) Patent No.: US 11,950,300 B2
(45) Date of Patent: Apr. 2, 2024

(54) USING A SMARTPHONE TO CONTROL ANOTHER DEVICE BY VOICE

(71) Applicant: SoundHound, Inc., Santa Clara, CA (US)

(72) Inventor: Keisuke Tsuchida, Tokyo (JP)

(73) Assignee: SoundHound, Inc.

( * ) Notice: Subject to any disclaimer, the term of this patent is extended or adjusted under 35 U.S.C. 154(b) by 258 days.

(21) Appl. No.: 17/372,123

(22) Filed: Jul. 9, 2021

(65) Prior Publication Data
US 2023/0010815 A1    Jan. 12, 2023

(51) Int. Cl.
*H04W 76/11*     (2018.01)
*G10L 15/08*     (2006.01)
*H04W 4/50*     (2018.01)

(52) U.S. Cl.
CPC ............. *H04W 76/11* (2018.02); *G10L 15/08* (2013.01); *H04W 4/50* (2018.02); *G10L 2015/088* (2013.01)

(58) Field of Classification Search
CPC ....... H04W 76/10; H04W 76/11; H04W 4/50; G10L 15/08; G10L 2015/088
See application file for complete search history.

(56) References Cited

U.S. PATENT DOCUMENTS

| | | | | |
|---|---|---|---|---|
| 6,546,095 B1 * | 4/2003 | Iverson | ............. | H04M 3/42153 379/201.12 |
| 10,447,795 B2 | 10/2019 | Digilov et al. | | |
| 10,609,070 B1 * | 3/2020 | Farmer, III | ........... | H04L 63/126 |
| 11,012,233 B1 * | 5/2021 | Uhr | ........ | H04L 9/3226 |
| 11,044,240 B2 * | 6/2021 | Dowlatkhah | ........... | H04L 63/08 |
| 2004/0039911 A1 * | 2/2004 | Oka | ........ | G06Q 30/06 705/51 |
| 2005/0105735 A1 * | 5/2005 | Iino | ........ | H04L 63/0807 713/155 |
| 2006/0020543 A1 * | 1/2006 | Sheehan | ................ | G06Q 30/06 705/40 |
| 2006/0029296 A1 * | 2/2006 | King | ................ | H04N 1/00381 382/313 |
| 2006/0122903 A1 * | 6/2006 | Medrano | ................ | G06Q 99/00 705/500 |
| 2006/0259307 A1 * | 11/2006 | Sanders | ................ | G06Q 50/18 705/26.1 |

(Continued)

OTHER PUBLICATIONS

Nuance Communications, Inc., Using the Dragon Remote Microphone application with Dragon NaturallySpeaking, Knowledge Base, Jan. 28, 2016.

*Primary Examiner* — Jenee Holland
(74) *Attorney, Agent, or Firm* — Michelle C. Dunn

(57) ABSTRACT

A method and system for implementing a speech-enabled interface of a host device via an electronic mobile device in a network are provided. The method includes establishing a communication session between the host device and the mobile device via a session service provider. According to some embodiments, a barcode can be adopted to enable the pairing of the host device and mobile device. Furthermore, the present method and system employ the voice interface in conjunction with speech recognition systems and natural language processing to interpret voice input for the hosting device, which can be used to perform one or more actions related to the hosting device.

27 Claims, 11 Drawing Sheets

(56) References Cited

U.S. PATENT DOCUMENTS

| | | | |
|---|---|---|---|
| 2013/0167208 A1* | 6/2013 | Shi | H04L 63/18 |
| | | | 726/5 |
| 2016/0182645 A1* | 6/2016 | Panec | H04L 67/51 |
| | | | 709/227 |
| 2017/0099361 A1 | 4/2017 | Digilov et al. | |
| 2017/0244676 A1* | 8/2017 | Edwards | H04W 12/06 |
| 2017/0262845 A1* | 9/2017 | Eisen | G06Q 20/02 |
| 2018/0068103 A1* | 3/2018 | Pitkänen | G06Q 20/40145 |
| 2019/0140844 A1* | 5/2019 | Brown | H04L 63/0428 |
| 2019/0182113 A1* | 6/2019 | Alam | H04L 43/16 |
| 2019/0213209 A1* | 7/2019 | Yang | G06F 16/48 |
| 2020/0092272 A1* | 3/2020 | Eisen | G06Q 20/202 |
| 2020/0366484 A1* | 11/2020 | So | H04L 9/0825 |

* cited by examiner

USING A SMARTPHONE TO CONTROL ANOTHER DEVICE BY VOICE

TECHNICAL FIELD

The present subject matter is in the field of wireless device connectivity and automatic speech recognition (ASR). More particularly, embodiments of the present subject matter relate to a method and system for using an electronic mobile device to implement a speech-enabled interface of another device.

BACKGROUND

As a popular human-machine interface, a voice-enabled interface for a computing device has many advantages over traditional input interfaces, such as keyboards or mice. This is partially because it enables a user to use speech, e.g., voice queries or commands, to interact with a computing device. It frees the user's hands for other simultaneous tasks. Another benefit of a voice interface is its cleanliness: a person can avoid touching a publicly shared item that could spread viruses and diseases. Examples of applications by voice interfaces include dialogs with a digital assistant at home, voice commands with a car. Another application is to control devices in a smart home: a user can use speech to control light switches and other connected electronic devices at home.

Several problems exist for implementing a voice interface to many existing computing devices. First, many legacy devices do not have a built-in microphone for receiving voice queries to implement a speech-enabled interface. For example, a vending machine or digital signage in a shopping mall typically does not have microphones for handling voice queries. Second, even for a device with built-in microphones, the audio quality of such microphones can be poor due to background noise in a public space or the distance of the user from the microphones.

SUMMARY OF THE INVENTION

The present subject matter pertains to improved approaches to implement an ad hoc voice interface to a computing device through a network by providing an authentication-free method to easily pair up individual devices. Specifically, a mobile electronic device can be used as a personal microphone so that the user can interact with a host device through voice commands. It further improves the accuracy of automatic speech recognition systems as the mobile device has a dedicated microphone for receiving the speech signal in high quality.

A method of the present subject matter comprises establishing a communication session between the host device and the mobile device via a session service provider. According to some embodiments, a barcode can be adopted to enable the pairing of the host device and mobile device. Furthermore, some embodiments of the present subject matter employ the voice interface in connection with speech recognition systems and natural language processing to interpret the meaning of the voice input for the hosting device, which can be used to perform one or more actions related to the hosting device.

Moreover, the mobile device can function as a peripheral input device for a host device, which can expand the voice interface to other input interfaces, e.g., through a touch screen of the mobile device, or through a keyboard of the mobile device.

The present subject matter can be implemented in numerous ways, including as a method, system, device, or apparatus, including computer-readable medium. Several embodiments of the present subject matter are discussed below.

According to some embodiments, the present subject matter discloses a computer-implemented method for pairing a mobile device with a selected host device as needed so that the host device can receive voice commands from a user. Such voice commands are further subjected to one or more speech recognition systems for natural language processing. The output of these systems is used to perform actions on the selected hosting device.

According to some embodiments, the present subject matter discloses a method comprising, receiving a session request from a mobile device to interact with a host device at a session service provider, wherein the session request comprises at least identification information of the mobile device and the host device; generating, by the session service provider, a session ID at least based on the session request; transmitting the session ID to the host device and the mobile device by the session service provider; and managing a communication session associated with the session ID between the host device and the mobile device by the session service provider, wherein the host device is configured to receive a voice command from the mobile device. Furthermore, the session service manager is configured to initiate, maintain, and terminate the communication session according to one or more underlying network protocols, such as Transmission Control Protocol (TCP) and User Datagram Protocol (UDP).

According to some embodiments, the method of the present subject matter further discloses: prior to receiving the session request, receiving a barcode request from the host device to generate a barcode associated with the host device and the session service provider at the session service provider; and generating the barcode by the session service provider, wherein the barcode is displayed on the host device and further accessed by the mobile device. According to some embodiments, a barcode can be a Quick Response (QR) code, which can comprise a bonding ID associated with the host device and access information of the session service provider.

According to some embodiments, the present method discloses scanning, via a camera of the mobile device, the bonding code displayed on the host device, wherein a decoder of the mobile device is configured to decode the bonding code to obtain the bonding ID of the host device and the access information of the session service provider.

According to some embodiments, the present method further discloses receiving a pin request from the host device to generate a pin code at the session service provider; and generating the pin code associated with the host device and the session service provider by the session service provider, wherein the pin code is displayed on the host device and further accessed by the mobile device. The mobile device is then prompted to enter the pin that is configured to initiate the communication session between the devices.

According to some embodiments, the present subject matter discloses a computer-implemented method that comprises receiving a bonding request from a host device to generate a bonding code at a session service provider; generating the bonding code encoding a bonding ID of the host device and access information of the session service provider by the session service provider, wherein the bonding code is displayed on the host device and further accessed by a mobile device; receiving a session request from the mobile device at the session service provider; generating a session ID at least partially based on the session request by the session service provider; and managing a communication session associated with the session ID between the host device and the mobile device by the session service provider.

According to some embodiments, the present subject matter discloses a computer system that comprises: at least one processor; and memory including instructions that, when executed by the at least one processor, cause the computer system to receive, at a session service provider, a session request from a mobile device to interact with a host device, wherein the session request comprises at least identification information of the mobile device and the host device; generate a session ID at least based on the session request by the session service provider; transmit the session ID to the host device and the mobile device by the session service provider; and manage a communication session associated with the session ID between the host device and the mobile device by the session service provider, wherein the mobile device is configured to interact with the host device during the communication session.

According to some embodiments, a speech recognition application in communication with the session service provider is configured to infer at least one semantic meaning of the voice command. According to some embodiments, a speech recognition system can subscribe to communications associated with the session ID.

According to some embodiments, the speech recognition system is configured to infer at least one semantic meaning of the voice command, generate a query output in response to the voice command, and display the query output on at least one display associated with the host device and the mobile device, or a combination of both. According to some embodiments, the query output can be provided via other interfaces, such as synthesized speech.

According to some embodiments, the speech recognition system is configured to infer at least one semantic meaning of the voice command; and perform, by the host device, one or more actions based on the semantic meaning of the voice command.

Furthermore, being subscribed to the same session ID, one or more host devices can join communications associated with the session ID. Similarly, one or more mobile devices that are subscribed to one session ID can receive the communications associated with the same session ID.

According to some embodiments, a session communication can be terminated by the session service provider via one more termination parameters. Such termination parameters can be a predetermined amount of time, a predetermined distance between the devices, or a prompt that enables a user to manually terminate the session either by voice commands or a press of a button. The termination parameters can also be a combination of numerous factors such as time and distance.

According to some embodiments, a terminated session communication can be resumed or recovered automatically when the mobile device approaches the host device within a certain distance. For example, when the two devices are located within a private and secure network that is trusted by the user, e.g., within the user's home WiFi network. On the other hand, a previously terminated session communication is not recoverable, which means the two devices need to establish a new communication session through the session service provider. For example, when the user manually selected to conclude a session. According to some embodiments, a session request can be automatically initiated when the mobile device and the host device are located within a predetermined distance.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings and in which.

DETAILED DESCRIPTION

The present subject matter pertains to improved approaches to enable a mobile device to function as a personal microphone so that a user can interact with one or more host devices through voice interfaces. Embodiments of the present subject matter are discussed below with reference to FIGS. 1-11.

In the following description, for purposes of explanation, numerous specific details are set forth in order to provide a thorough understanding of the present subject matter. It will be apparent, however, to one skilled in the art that the present subject matter may be practiced without some of these specific details. In addition, the following description provides examples, and the accompanying drawings show various examples for the purposes of illustration. Moreover, these examples should not be construed in a limiting sense as they are merely intended to provide examples of embodiments of the subject matter rather than to provide an exhaustive list of all possible implementations. In other instances, well-known structures and devices are shown in block diagram form in order to avoid obscuring the details of the disclosed features of various described embodiments.

Figure 1:
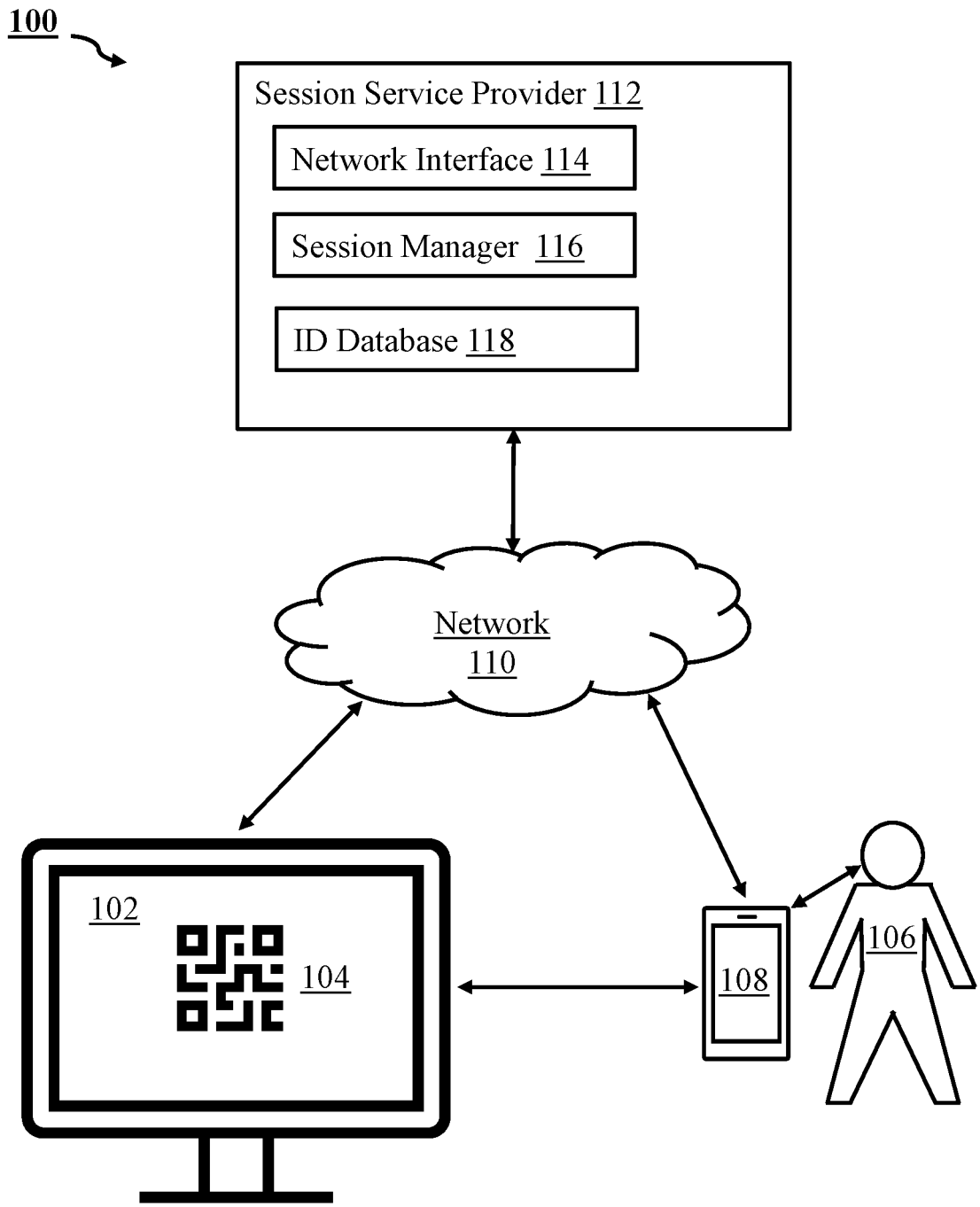
FIG. 1 shows a system that is configured to enable a mobile device to interact with a host device via an established communication session, according to one or more embodiments of the present subject matter.

FIG. 1 shows a system 100 that is configured to enable user 106 using electronic mobile device 108 ("mobile device" hereinafter) to interact with proximate target device 102 via session service provider 112 through network 110, according to some embodiments of the present subject matter.

Network 110 can comprise a single network or a combination of multiple networks, such as the Internet or intranets, wireless cellular networks, local area network (LAN), wide area network (WAN), WiFi, Bluetooth, near-field communication (NFC), etc. Network 110 can comprise a mixture of private and public networks, or one or more local area networks (LANs) and wide-area networks (WANs) that may be implemented by various technologies and standards.

Mobile device 108 can be a personal, portable computing device that has at least one microphone for receiving voice commands and at least one network interface for wireless connection. Examples of mobile device 108 include a personal digital assistant, a mobile or a smartphone, a wearable device such as a smartwatch, a smart glass, a tablet computer, or an automobile. Mobile device 108 can have at least one microphone, and at least one camera as I/O (input/output) devices. Mobile device 108 can have at least one network interface configured to connect to network 110.

Mobile device 108 can comprise one or more microphones that are configured to receive voice commands of user 106 and generate audio data based on the voice queries for speech recognition. Such audio data can comprise time-series measurements, such as time series pressure fluctuation measurements and/or time series frequency measurements. For example, one or more channels of Pulse Code Modulation (PCM) data may be captured at a predefined sampling rate where each sample is represented by a predefined number of bits. Audio data may be processed following capture, for example, by filtering in one or more of the time and frequency domains, by applying beamforming and noise reduction, and/or by filtering and normalization. In one case, audio data may be converted into measurements over time in the frequency domain by performing the Fast Fourier Transform to create one or more frames of spectrogram data. According to some embodiments, filter banks may be applied to determine values for one or more frequency domain features, such as Mel-Frequency Cepstral Coefficients. Audio data as described herein for speech recognition may comprise a measurement made within an audio processing pipeline.

Speech recognition can comprise statistical inference of phonemes or senones and then tokenization of those into characters or words to form a transcription. Statistical inference can be performed by models such as hidden Markov models or neural networks. Natural language processing can be performed on transcriptions of speech using methods such as comparing phrasings to grammar rules or inference of intents using neural networks. Either or both of speech recognition and natural language processing can be performed locally within mobile device 108, within the cloud such as by session service provider 112, by a third-party service provider through a web API, or within proximate target device 102. In various such embodiments, either audio data, text, structured data in formats such as Javascript Object Notation (JSON), or other formats of representations of user speech are sent between mobile device 108, session service provider 112, and proximate target device 102. In some embodiments, the data sent between devices and service providers is encrypted before transmission through a network and decrypted when received.

Proximate target device 102 can be a host device that is within a certain proximity of mobile device 108. It can be a terminal device, billboard, public signage, a kiosk, a vending machine, or a computing device that has at least one network interface to enable a bonding or pairing with mobile device 108. Proximate target device 102 can have a network interface configured to communicate with other devices via network 110. According to some embodiments, Proximate target device 102 can be a connected computing device without a personal, portable, dedicated microphone for a voice interface.

Session service provider 112 can comprise a network interface and implement one or more communications protocols. According to some embodiments, session service provider 112 can comprise network interface 114 configured to connect with other devices in the network. According to some embodiments, a network interface may comprise a wired or wireless physical interface and one or more communications protocols that provide methods for receiving data in a predefined format. Network interface 114 is configured to receive data from the mobile device 108 and proximate target device 102 over the network 110.

Session service provider 112 can be implemented remotely by processors in a host server in a cloud-based processing structure. Alternatively, at least partial functions of session service provider 112, such as speech recognition, can be implemented by local computing devices. According to some embodiments, session service provider 112 can be a web service provider that can be reached through a URL (Uniform Resource Locator).

According to some embodiments, Session service provider 112 may comprise an application layer operating on top of an Internet Protocol Suite. The application layer interface may be configured to receive communications directed towards a particular Internet Protocol address identifying the session service provider 112, with routing based on path names or web addresses being performed by one or more proxies and/or web servers.

According to some embodiments, session service provider 112 can function as an intermediator to enable a session communication between proximate target device 102 and mobile device 108 with underlying network protocols, such as TCP and UDP. Session service provider 112 can further comprise session manager 116 to verify, initiate, maintain and terminate a communication session. According to some embodiments, session service provider 112 can further comprise ID database 118 configured to store various identifiers of the present subject matter, e.g., bonding IDs, mobile ID, session ID, etc.

According to some embodiments, user 106 would like to use voice to control proximate target device 102, which does not have a microphone for receiving audio input. To use mobile device 108 as a microphone for this purpose, user 106 can send a demand to pair mobile device 108 with proximate target device 102. For example, user 106 can press a virtual or physical button to request a temporary bonding of the two devices. The virtual or physical button can be disposed on mobile device 108 or proximate target device 102. According to some embodiments, instead of manually initiating the bonding, a demand to pair devices can be automatically initiated once the two devices reach within a certain distance, e.g., 10 ft, via, for example, Bluetooth proximity detection, radio-frequency identification (RFID) sensing or other near field communication mechanisms.

Upon receiving the mobile device's demand, proximate target device 102 can send a bonding request to session service provider 112 to generate a bonding code. The bonding request can comprise various information reflecting the identity, location and/or time of the bonding request. An example of such information can be a bonding ID or a target device ID, location information, an IP address, or a URL of proximate target device 102.

Upon receiving the bonding request, session service provider 112 can create and transmit a bonding code 104 to host device via network 110. A bonding code can adopt a form of an information storage format for encoding the requisite data, e.g., a bonding ID associated with the host device, and a URL for accessing session service provider 112.

An example of the bonding code can be a barcode, which can represent data in a visual, machine-readable form. According to some embodiments, the bonding code can be a 2D barcode, such as a QR (Quick Response) code. Compared with a linear barcode, a QR code has the advantages of prompt readability and relatively large storage capacity.

According to some embodiments, a QR code can be dynamically generated by a QR generator application of session service provider 112, which can encode the bonding ID provided by proximate target device 102 and a URL address for session service provider 112. According to some embodiments, the QR code generation can be separated from session service provider 112. For example, it can be generated locally on proximate target device 102.

Moreover, according to some embodiments, instead of a dynamic QR code that is generated on-demand, a QR code can be static and predetermined. It can be previously generated without a bonding request and pre-assigned to proximate target device 102. In such cases, the static QR code can be constantly displayed on a user interface of proximate target device 102, inviting a potential pairing with a mobile device. In another example, the static QR code can be printed out on paper and evidently placed near the host device. Similar to a dynamic QR code, the static QR code can also comprise the bonding ID or target device ID associated with proximate target device 102 and a URL address for session service provider 112.

After receiving bonding code 104, e.g., a QR code, proximate target device 102 can show the code on its display. User 106 can use a camera of mobile device 108 to scan bonding code 104. A decoder of mobile device 108 can decrypt bonding code 104 to obtain the bonding ID and the URL of proximate target device 102. In some embodiments, scanning a bonding code can be done by an appropriately programmed application software (app) designed for initiating or controlling a voice session with a host device. In some embodiments, scanning is done by a common app such as Google Lens or a generic camera app. In some embodiments, the scanning is controlled by software built into the operating system software of mobile device 108 such as an Android or Apple iOS operating system. In some embodiments, the scanning is controlled by custom embedded software such as software for smart control of an automobile.

According to some embodiments, mobile device 108 can be associated with a mobile ID that can comprise one or more of a mobile phone number, a device ID, a user ID, an account ID, an IP address, or a hashed format of multiple identifiers. According to some embodiments, the mobile ID can be encrypted to provide data security and privacy.

To generate a communication session, mobile device 108 can send a session request to session service provider 112 via the provided URL, wherein the session request comprises at least the bonding ID. According to some embodiments, a session request is initiated following the scanning and decoding of bonding code 104. According to some embodiments, without any action or confirmation from mobile device 108, a session request is automatically initiated, when the mobile device 108 and proximate target device 102 are within a predetermined distance, e.g., 10 ft. According to some embodiments, the session request can also comprise the mobile ID as described herein. According to some embodiments, instead of disclosing the mobile ID, the session request can comprise location data and request timing data that enables a unique identification of mobile device 108.

Next, to initiate a communication session, session service provider 112 can generate a session ID at least partially based on data retrieved from the session request. A communication session can be a temporary and interactive information interchange between two or more communicating devices. It can be implemented in different layers, e.g., the application layer, the session layer, or the transport layer of the OSI model (Open Systems Interconnection model). For example, a communication session can be implemented in the transport layer by the Transmission Control Protocol (TCP), or the User Datagram Protocol (UDP).

A session ID can be a session identifier to identify a session in network communications. For example, it can be a uniquely generated sequence of data with a predetermined format. According to some embodiments, the session ID is short-lived, meaning it expires after a certain amount of time. According to some embodiments, the session ID can be permanent. Furthermore, session service provider 112 can transmit the session ID to proximate target device 102 and mobile device 108 to establish a communication session between the two devices.

During the communication session, mobile device 108 can implement a temporary voice interface for interaction with proximate target device 102. For example, user 106 wants to dictate text by speaking the content. Even though the desktop computer 102 has a built-in microphone, it is not close enough for voice dictating, or there is too much background noise. Therefore, the user can use his/her mobile phone as a personal microphone for dictating the text, according to the method of the present subject matter.

Figure 2:
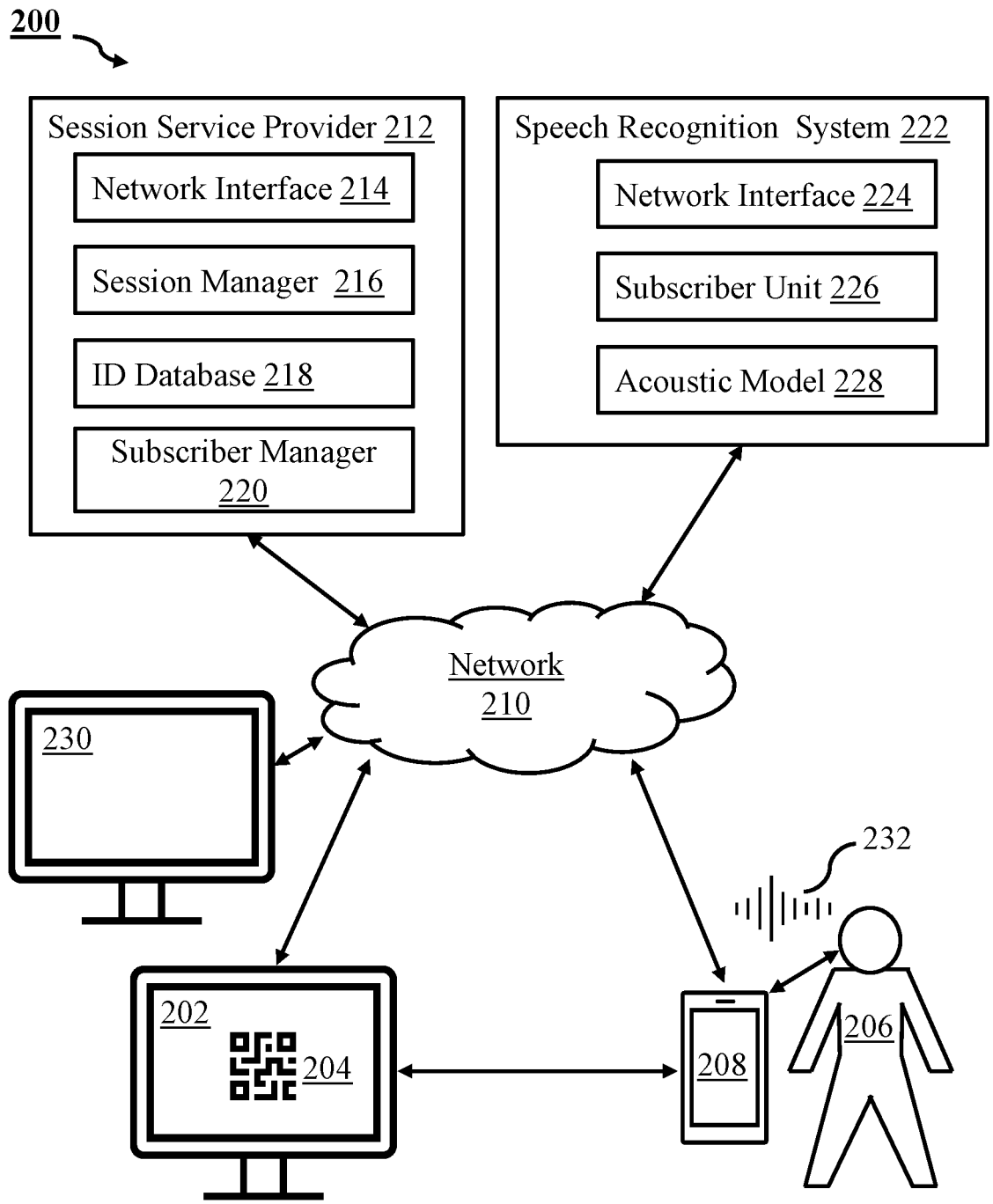
FIG. 2 shows a system with a plurality of devices as query subscribers, the system is configured to enable a mobile device to interact the plurality of host devices via voice commands, according to one or more embodiments of the present subject matter.

FIG. 2 shows a system 200 with multiple query subscribers. A query subscriber is a device or application that can subscribe to a session ID so that it can receive, or process data transmitted in the corresponding communication session. System 200 is configured to establish a communication session between a mobile device 208 and host devices, e.g., 202, 230 via speech recognition system 222 and session service provider 212 through network 210, as described herein.

According to some embodiments, host device 202 or 230 can be a proximate target device that is within a certain proximity of mobile device 208. According to some embodiments, host device 202 and 230 can be located outside of predetermined proximity of mobile device 208. For example, it can be a terminal device, billboard, public signage, a kiosk, a vending machine, or a computing device that has at least one network interface to enable a bonding or pairing with mobile device 208. Host device 202 or 230 can have a network interface configured to communicate other devices via network 210. According to some embodiments, Host device 202 or 230 can be a connected computing device without a personal, portable, dedicated microphone for a voice interface.

As shown in FIG. 2, session service provider 212 can comprise one or more network interface 214, session manager 216, ID database 218 as disclosed herein. According to some embodiments, it can further comprise subscriber manager 220 for managing query subscribers that subscribe to the same session ID. Subscriber manager 220 can share the session ID with speech recognition system 222 as a query subscriber.

As a query subscriber, speech recognition system 222 can receive data such as digitized speech audio in the established communication session. Speech recognition system 222 can be an Automatic Speech Recognition (ASR) and natural language understanding (NLU) system that is configured to infer at least one semantic meaning of a voice command based on various statistical acoustic and language models and grammars. According to some embodiments, speech recognition system 222 can comprise at least one acoustic model 228. Speech recognition system 222 can further comprise one or more pronunciation models (lexicons) and language models for natural language processing.

According to some embodiments, to use mobile device 208 as a microphone for host devices 202 and 230, user 206 can be prompted to scan a bonding code 204 displayed on a UI of one host device. According to some embodiments, scanning a bonding code can be done by an application designed for initiating or controlling a voice session with a host device. In some embodiments, scanning is done by a common app such as Google Lens or a generic camera app. According to some embodiments, the scanning is controlled by software built into the operating system software of mobile device 208, such as an Android or Apple iOS operating system. In some embodiments, the scanning is controlled by custom embedded software such as software for smart control of an automobile.

According to some embodiments, when the mobile device and the host devices reach a predetermined distance, e.g., 5 ft, using Bluetooth proximity detection or using RFID sensing, a bonding code can be automatically generated and displayed on the host device without any user initiation. According to some embodiments, a static bonding code can be pre-generated and displayed nearby the host device.

In this example, bonding code 204 is a QR code but should not be limited to it. A QR decoder associated with mobile device 208 can decode the code and extract identification information of host devices 202 and 230 and session service server 212, e.g., at least a bonding ID/target ID identifying the host device, and a URL to access session service provider.

Next, to establish a communication session, mobile device 208 can send a session request to session service provider 212 through the provided URL. According to some embodiments, the session request can comprise identification information of the requesting mobile device and the host device, such as a mobile ID, a bonding ID/a target device ID, location information, or an IP address associated with each device, as described herein.

According to some embodiments, a session request is initiated following the scanning and decoding of bonding code 204. According to some embodiments, without any action or confirmation from mobile device 208, a session request can be automatically initiated as soon as the mobile device 208 and host device 202 are within a predetermined distance using, for example, Bluetooth proximity detection, RFID sensing or other near field communication mechanisms.

In response to the session request, session manager 216 can generate a session ID at least based on data retrieved from the session request and transmit it to mobile device 208 and host devices 202 or 230. Session manager 216 can also transmit the session ID to subscriber unit 226 of speech recognition system 222 because it is a query subscriber. Accordingly, a communication session moderated by session service provider 212 can be established between mobile device 208, speech recognition system 222 and one or more host devices 202 and 230.

According to some embodiments, a microphone of mobile device 208 can generate audio data 232 based on a voice command and transmit the data to speech recognition system 222 through network interface 224. Furthermore, speech recognition system 222 can comprise acoustic model 228 in connection with pronunciation models, language models, and grammars for inferring the meaning of a query/command. An acoustic model can be a statistical model that is based on hidden Markov models and/or neural network models, which are configured to infer the probabilities of phonemes in query audio. Examples of such acoustic models comprise convolutional neural network (CNN) and recurrent neural network (RNN). Phoneme probabilities or output from the speech recognition system 222 can be subject to natural language processing based on grammars or neural models to determine its semantic meaning. Accordingly, based on the inferred semantic meaning of the voice command, a response or an action can be determined or performed in response to the voice command.

According to some embodiments, when the voice command is a query for host device 202, a query output can be generated based on the meaning of the query, which can be displayed on at least one display of host device 202 and/or mobile device 208. For example, when a user asks, "how much is the iced coffee?" to a vending machine (the host device), the speech recognition system can infer the probable meaning of the query for determining a proper response. As a result, the price of an iced coffee (the query output) in the vending machine can be displayed either on a display of the vending machine or on the mobile phone. Other output interfaces such as a synthesized voice response can be adopted as a preferred format of the output.

According to some embodiments, when the voice command is a demand for actions of host device 202, one or more actions can be performed based on the meaning of the command. For example, when a user requests "give me an iced coffee" to a vending machine, the speech recognition system can infer the probable meaning of the command for determining a corresponding response. Consequently, the vending machine can pick and drop an iced coffee for the user. Moreover, during the session, mobile device 208 can have other interactions with host device 202, such as making payment for a purchased product. This is possible, in some embodiments, by the speech recognition system 222 storing user payment information or by session service provider 212 working with a third-party payment service provider such as PayPal or CarPay-Diem.

According to some embodiments, speech recognition system 222 and natural language processing can be implemented remotely by one or more processors on a host server in a cloud-based processing structure. According to some embodiments, at least part of the speech recognition system 222 and natural language processing can be implemented locally by mobile device 208 or by host devices 202 or 230, or another local computing device.

According to some embodiments, during a communication session, mobile device 208 can function as a peripheral input device to provide control signals for host device 202. For example, clicking a virtual button on mobile phone 208 can provide a selection of a product in a vending machine, i.e., a host device 202. Accordingly, mobile phone 208 can be used to browse products, purchase, and pay for a product from the vending machine.

Figure 3:
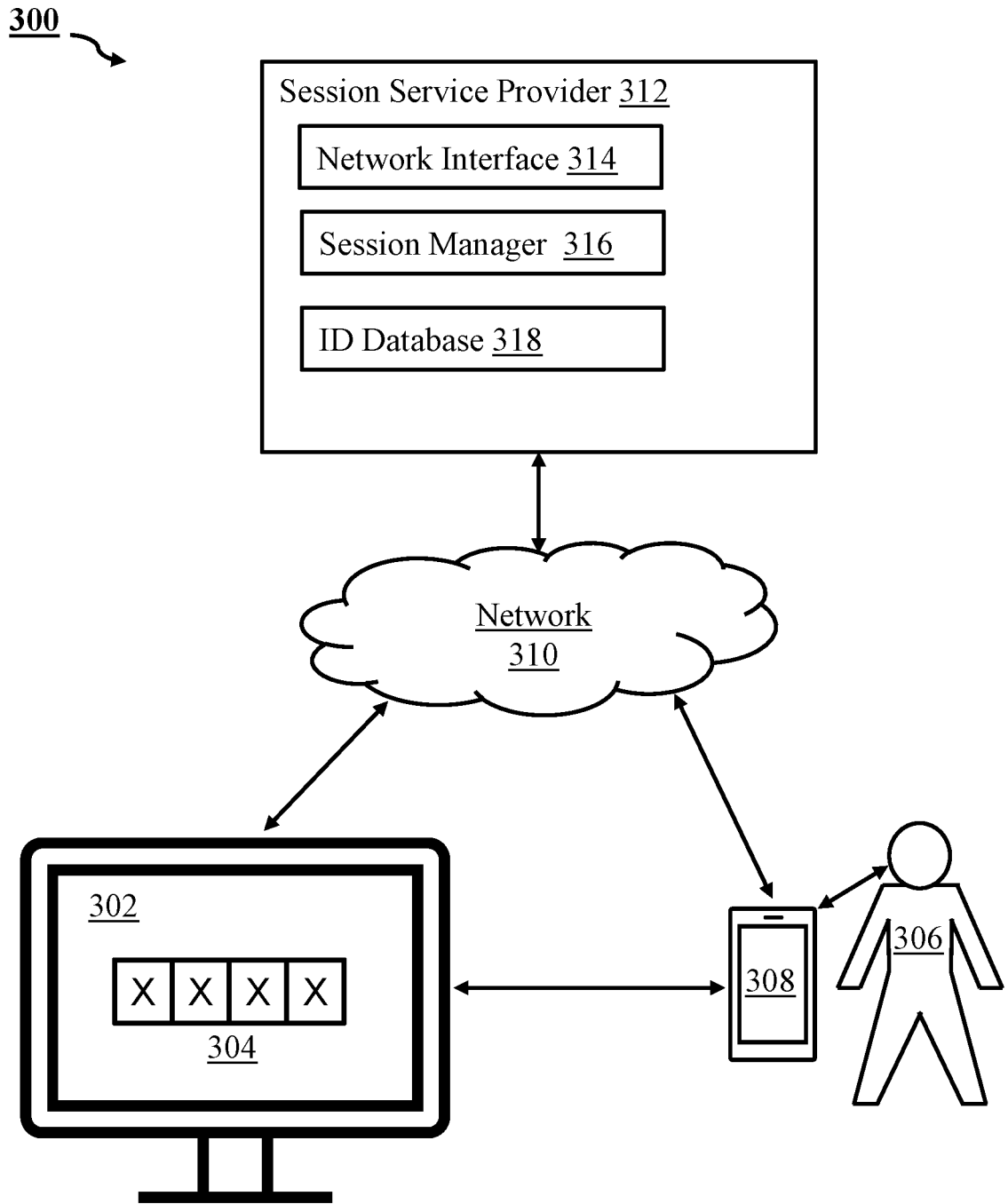
FIG. 3 shows another system that is configured to enable a mobile device to interact with a host device using at least a pin code, according to one or more embodiments of the present subject matter.

FIG. 3 shows a system 300 that is configured to use a mobile device 308 for interaction with host device 302 using at least a pin code 304. According to some embodiments, when approaching host device 302, user 306 can be prompted to first scan a QR code to encode identification information of host device 302 and a URL for accessing session service provider 312. Upon decoding the QR code, mobile device 308 can send a session request to session service provider 312 via network 310, wherein the session request can comprise identification information of the requesting mobile device and the host device, such as a mobile ID, a bonding ID/a target device ID, location information, an IP address associated with each device, or a hashed format of multiple identifiers, as described herein.

After receiving the session request with pairing-device information via network interface 314, session service provider 312 can verify the identity of each device, generate a session ID and share it with mobile device 308 and host device 302 to initiate a communication session based on underlying network protocols, such as TCP and UDP. According to some embodiments, to establish the session, user 306 is asked to enter pin code 304 into mobile device 308, which can further verify the identity of the bonding/pairing of the two devices.

According to some embodiments, the present subject matter can be implemented using only a pin code in conjunction with information stored in mobile device 308 or host device 302, thus eliminating the use of a QR code. According to some embodiments, an appropriately programmed application software (app) designed for initiating a session communication can store the URL information of the session service provider and/or the identification information of the mobile device/host device.

For example, when approaching host device 302, user 306 can be prompted to enter pin code 304 into mobile device 308, wherein pin code 304 can comprise host device 302's identification information, such as a bonding ID/target ID. According to some embodiments, pin code 304 can be dynamically generated by session service provider 312 following a request from host device 302. Mobile device 308 can retrieve stored identification information of mobile device 308 and the URL for accessing session service provider 312, for example, via the app. Accordingly, mobile device 308 can send a session request and establish a communication session through session service provider 312 as described herein.

Similar to other embodiments of the present subject matter, session manager 316 can initiate, maintain and terminate a communication session between host device 302 and mobile device 308, and ID database 318 can be used to store various identifiers of participants in the present session, e.g., bonding IDs, mobile ID, session ID, etc.

Figure 4:
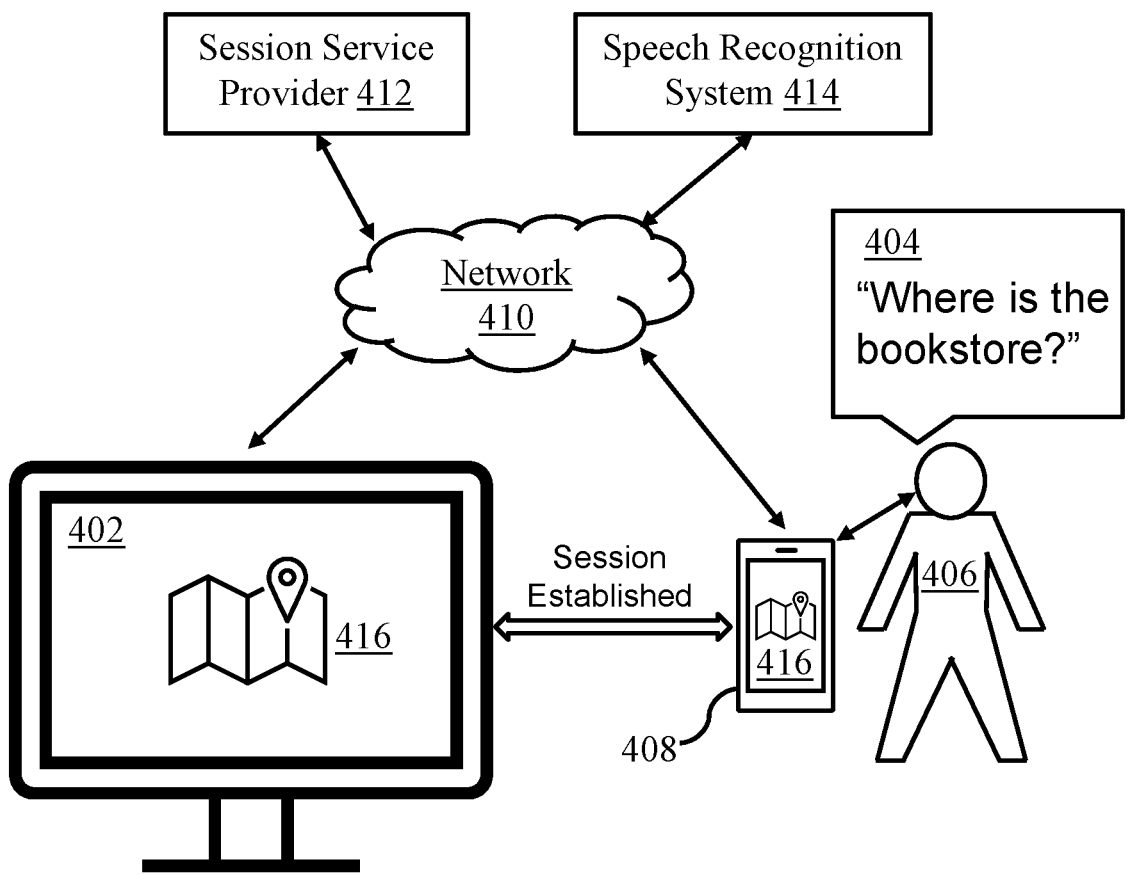
FIG. 4 shows an example in which the user can interact with a host device through a mobile phone during a communication session, according to one or more embodiments of the present subject matter.

FIG. 4 shows an example 400 in which user 406 can interact with public digital signage 402 through mobile phone 408 during an established session within network 410. According to some embodiments, session service provider 412 can initiate a communication session between public digital signage 402 and mobile device 408 as described herein. In addition, speech recognition system 414, as a query subscriber, can access communication data in the session and infer the likely meaning of a query as described earlier.

According to some embodiments, once the communication session is established, user 406 can use his phone's microphone(s) as his personal input device to communicate with public digital signage 402. This approach improves the audio quality for speech recognition because a public space often has substantial background noises. Another advantage of this method is to prevent the spreading of viruses and diseases caused by a publicly shared surface, such as a touch screen on the digital signage.

For example, user 406 can have a voice command 404 for public digital signage 402, such as "Where is the bookstore?" Query output 416, e.g., a pinned map indicating the bookstore location, can be displayed on host device 402. According to some embodiments, more than one host device can be used to display the response. According to some embodiments, query output 416 can also be displayed on mobile device 408. In addition, various output interfaces can be adopted to present the query output. A protocol for describing content to be rendered to a display, such as HyperText Markup Language 5 (HTML5), can be used to display content, such as a map, that can be shown similarly and simultaneously in multiple displays.

Figure 5:
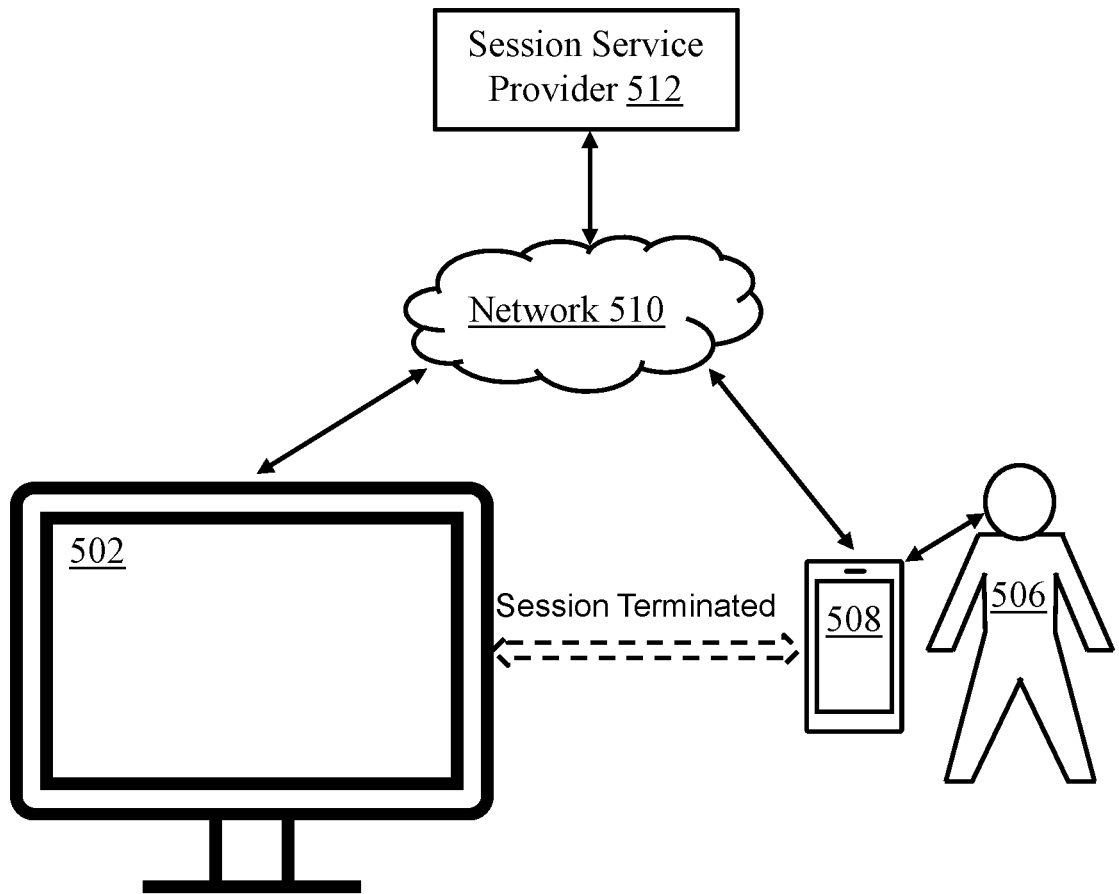
FIG. 5 shows an example in which the interaction between the user and the host device has terminated, according to one or more embodiments of the present subject matter.

FIG. 5 shows an example in which the interaction between the user and the host device has been terminated. As shown in FIG. 5, session service provider 512 can manage a communication session between host device 502 and mobile device 508 through network 510. The conclusion of a session can be based on one or more various termination factors or parameters, such as lapse of time, the change of distance between devices, or a user's command. For example, as the session ID can be short-lived, e.g., 5 mins, the communication session can be terminated once the session ID expires. In some embodiments, when user 506 walks away from host device 502, session service provider 512 can receive the location data, and consequently terminate the session. In yet another embodiment, user 506 can initiate the termination by providing user input, for example, via voice command or via clicking a selection on mobile device 508. According to some embodiments, session service provider 512 can determine whether to terminate a session based on a plurality of various factors as explained herein.

According to some embodiments, a terminated session is permanent and not recoverable. As a result, to reestablish a communication session between the client and host device, a new session ID needs to be issued and shared by session service provider 512. According to some other embodiments, for example, in a private and secured environment such as the user's home WiFi network, a terminated session can be recoverable to provide a convenient, verification-free connection between the devices. For example, when user 506 approaches host device 502 within a certain distance, by retrieving relevant identification information from the ID database, session service provider 512 can verify that a previous session existed between mobile device 508 and host device 502. Consequently, a new session can be automatically created, or the previous session can be automatically reinstated between the two devices.

Figure 6:
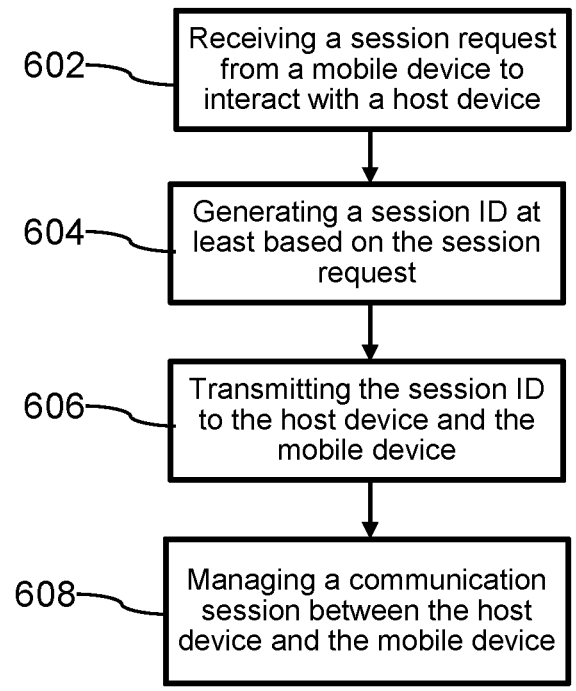
FIG. 6 is an exemplary flow diagram illustrating aspect of a method having features consistent with some implementations of the present subject matter.

FIG. 6 is an exemplary flow diagram illustrating aspects of a method having features consistent with some implementations of the present subject matter. At step 602, a session service provider, e.g., a host service server, can receive a session request from a mobile device to interact with a host device. The session service provider can be a host web server with one or more executed applications to implement numerous functions as described herein. According to some embodiments, the session service provider can comprise a web service provider that can be reached through a URL. The session service provider can also be at least partially hosted by a local device such as the mobile device or the host device.

The session request can comprise at least identification information of the mobile device and the host device. For example, the session request can comprise a bonding ID/target ID of the host device and/or the mobile ID related to the mobile device. In another example, instead of disclosing the mobile ID, the session request can comprise location and timing data for the unique identification of the mobile device.

As disclosed herein, a bonding ID can comprise a target device ID, location data, or an IP address of the host device. Similarly, a mobile ID can comprise one or more of a mobile phone number, a device ID, a user ID, an account ID, an IP address, or a hashed format of multiple identifiers. According to some embodiments, the mobile ID can be encrypted to provide data security and privacy.

According to some embodiments, prior to receiving the session request, the session service provider can receive a barcode request to generate a barcode associated with the target device and the session service provider. Based on the request information, the session service provider can generate the barcode to share with the host device. After receiving the barcode, the host device can display the code for scanning and decoding by the mobile device.

According to some embodiments, the barcode comprising information of the host device and the session service provider can be pre-generated and "permanently" displayed near the host device. Once a mobile device scans the barcode with its built-in camera, a decoder can decode and retrieve the relevant information stored in the barcode.

At step 604, the session service provider can generate a session ID based on at least information of the session request. At step 606, the session service provider can transmit the session ID to the host device and the mobile device in the network. At step 608, the session service provider can initiate, maintain and terminate a communication session between the devices. These are steps of managing the communication session. Specifically, the host device can receive user input, such as a voice command, through microphones of the mobile device.

A session ID can be a session identifier for identifying a session, which is for a series of related message exchanges. A session ID can be a uniquely generated sequence of data with a predetermined format. According to some embodiments, the session ID is short-lived and unrecoverable. According to some embodiments, the session ID can be permanent. According to some embodiments, the session ID can be reinstated from a terminated session.

According to some embodiments, a query subscriber is a device or application that can subscribe to the same session ID so that it can receive or process data transmitted in the corresponding communication session. In the present subject matter, one or more target devices or mobile devices can subscribe to the same session ID as query subscribers.

According to some embodiments, a microphone of the mobile device can generate audio data based on a voice command and transmit it to speech recognition by a speech recognition and natural language understanding system. A speech recognition and natural language understanding system can be an ASR system that is configured to infer at least one semantic meaning of a voice command based on various statistical acoustic and language models and grammars. According to some embodiments, the speech recognition system can comprise at least one acoustic model. The speech recognition system can further comprise one or more pronunciation models (lexicons) and one or more language models to create a transcription. It may also comprise grammars or statistical models (e.g., neural networks) for natural language processing. The output of the speech recognition system is used to perform actions on the host device.

According to some embodiments, during a communication session, the mobile phone can function as a peripheral input device to provide control signals for the host device. For example, clicking a virtual button on a mobile phone can provide a selection of a product in a vending machine. Accordingly, the mobile phone can be used to browse products, purchase and pay for a product from the vending machine. According to some embodiments, the system can store user payment information by collaborating with a third-party payment service provider, such as PayPal or CarPay-Diem.

Figure 7:
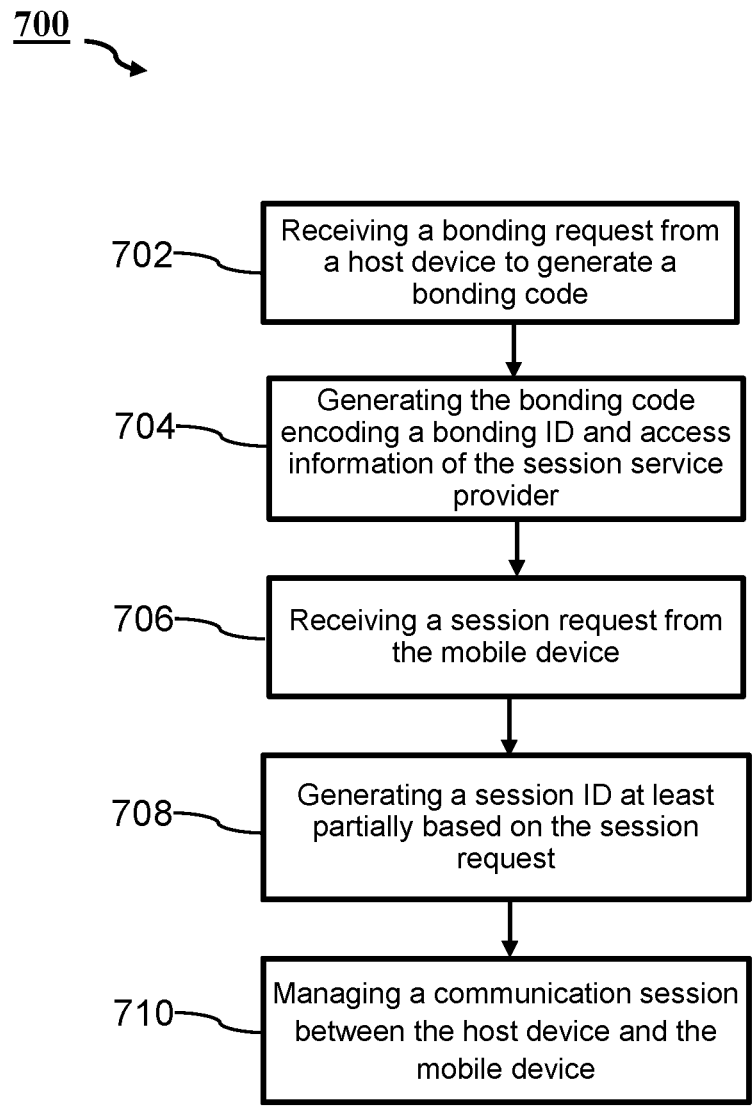
FIG. 7 is another exemplary flow diagram illustrating aspect of another method having features consistent with some implementations of the present subject matter.

FIG. 7 is another exemplary flow diagram illustrating aspects of a method having features consistent with some implementations of the present subject matter. At step 702, a session service provider can receive a bonding request from a host device to generate a bonding code. At step 704, the session service provider can generate the bonding code encoding the host device information and access information of the session service provider. The session service provider can transmit the bonding code to the host device, which can be scanned and decoded by the mobile device.

At step 706, the mobile device can send a session request that comprises at least identification information of the mobile device and the host device. At step 708, the session service provider can generate a session ID and share it with the two devices. At step 708, the session service provider can initiate, maintain, and terminate a communication session that is assigned the session ID.

The conclusion of a session can be based on one or more various termination factors, such as lapse of time, change of distance between devices, or a user's command. For example, as the session ID can be short-lived, e.g., 5 mins, the communication session can be terminated once the session ID expires. In another example, when a user walks away from the host device, the session service provider can consequently terminate the session by sensing the phone's location change. In another example, a user can end the session by providing user input, for example, via a voice command or via a selection on the mobile device. According to some embodiments, the session service provider can determine whether to terminate a session based on a plurality of various factors, as explained herein.

According to some embodiments, a terminated session is permanent and not resumable. As a result, to reestablish a communication session between the client and host device, a new session ID shall be issued and shared by the session service provider. According to some other embodiments, for example, in a private network, an ended session can be resumed to provide a convenient, verification-free connection between two trusted devices. For example, when a user approaches a host device within a certain distance, the session service provider can verify that a previous session existed between the mobile device and the host device. As a result, a new session can be automatically created, or the previous session can be automatically reinstated between the two devices.

Figure 8A:
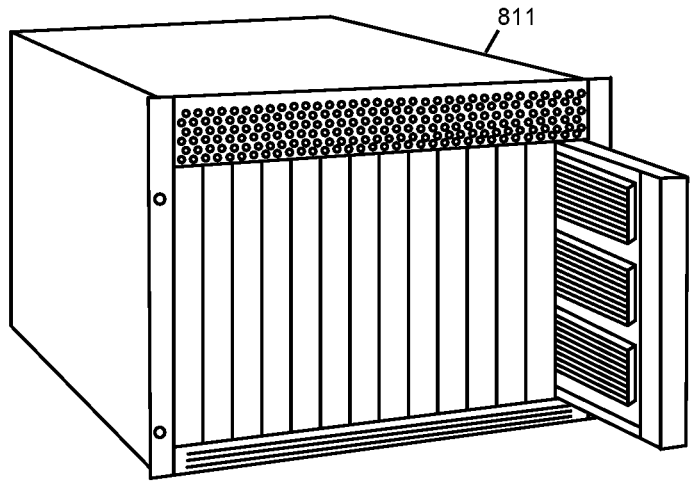
FIG. 8A shows a cloud server according to one or more embodiments of the present subject matter.
Figure 8B:
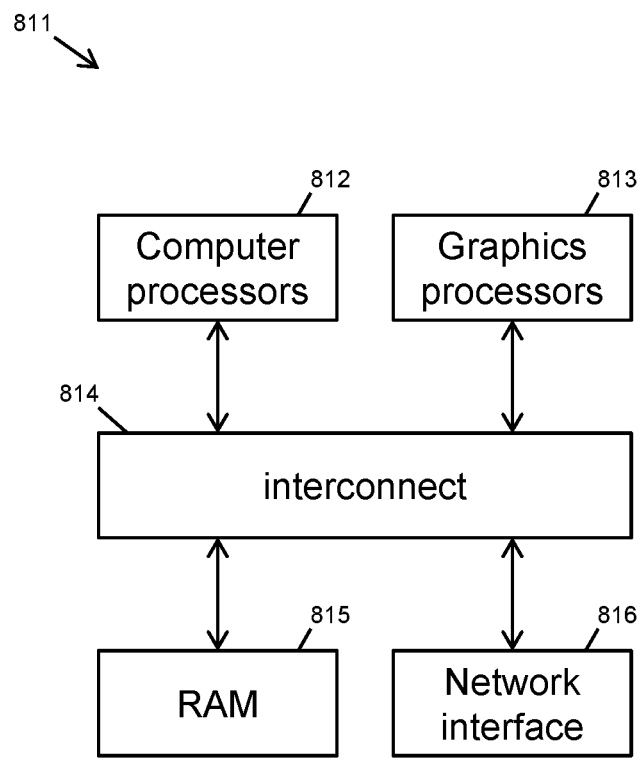
FIG. 8B shows a diagram of a cloud server according to one or more embodiments of the present subject matter.

FIG. 8A shows a picture of a server system 811 in a data center with multiple blades that can be used to implement one or multiple aspects of the present subject matter. For example, server system 811 can host one or more applications related to a session service provider and/or a speech recognition system. FIG. 8B is a block diagram of functionality in server systems that can be useful for managing sessions between mobile devices and host devices. Server system 811 comprises one or more clusters of central processing units (CPU) 812 and one or more clusters of graphics processing units (GPU) 813. Various implementations may use either or both of CPUs and GPUs.

The CPUs 812 and GPUs 813 are connected through an interconnect 814 to random access memory (RAM) devices 815. RAM devices can store temporary data values, software instructions for CPUs and GPUs, parameter values of neural networks or other models, audio data, operating system software, and other data necessary for system operation.

The server system 811 further comprises a network interface 816 connected to the interconnect 814. The network interface 816 transmits and receives data from mobile devices and host devices such as speech audio and other data necessary for system operation.

Figure 9:
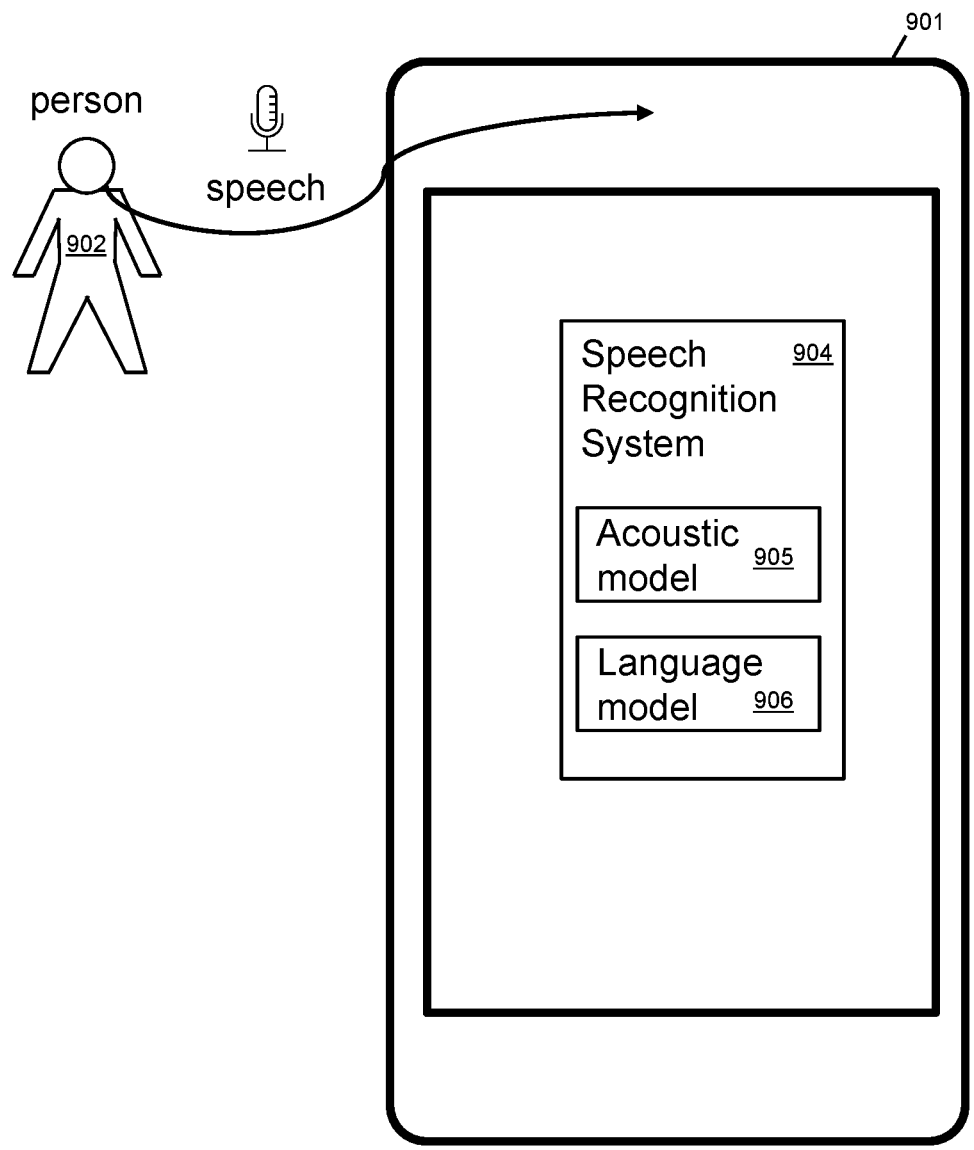
FIG. 9 shows a mobile device for implementing the present subject matter, according to one or more embodiments of the present subject matter.

As described above, many types of devices may be used to provide speech-controlled interfaces for a host or host device. FIG. 9 shows a mobile phone as an example. Other devices can be a personal, portable computing device that has at least one microphone for receiving voice commands and at least one network interface for wireless connection, such as a personal digital assistant, a mobile or a smart phone, a wearable device such as a smart watch, a smart glass, a tablet computer, or an automobile. Mobile device 901 can have at least one microphone (not shown), and at least one camera (not shown) as I/O (input/output) devices. A user 902 provides speech audio to mobile device 901 via one or more embedded microphones. Mobile device 901 can include speech recognition system 904 that can translate speech audio into computer-readable format such as a text transcription or intent data structure. One or more acoustic model 905 can be used to infer the probabilities of phonemes in speech audio and one or more language model 906 can be used to infer the probability of word combinations in a transcription.

Figure 10A:
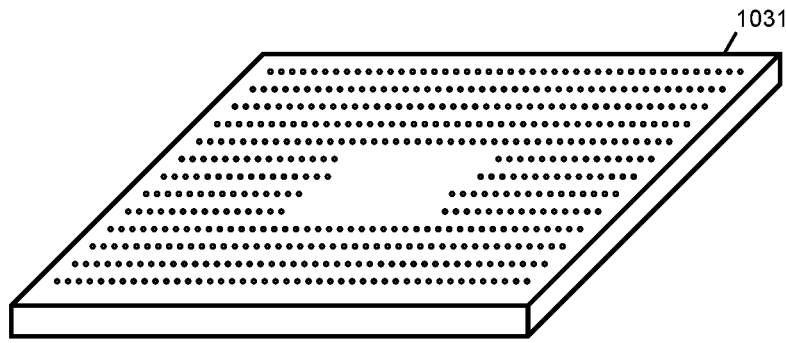
FIG. 10A shows a packaged system-on-chip according to one or more embodiments of the present subject matter.

Many embedded devices, edge devices, IoT devices, mobile devices, and other devices with direct user interfaces are controlled and have automatic speech recognition (ASR) performed by system-on-a-chip (SoCs). SoCs have integrated processors and tens or hundreds of interfaces to control device functions. FIG. 10A shows the bottom side of a packaged system-on-chip device 1031 with a ball grid array for surface-mount soldering to a printed circuit board. Various package shapes and sizes can be utilized for various SoC implementations.

Figure 10B:
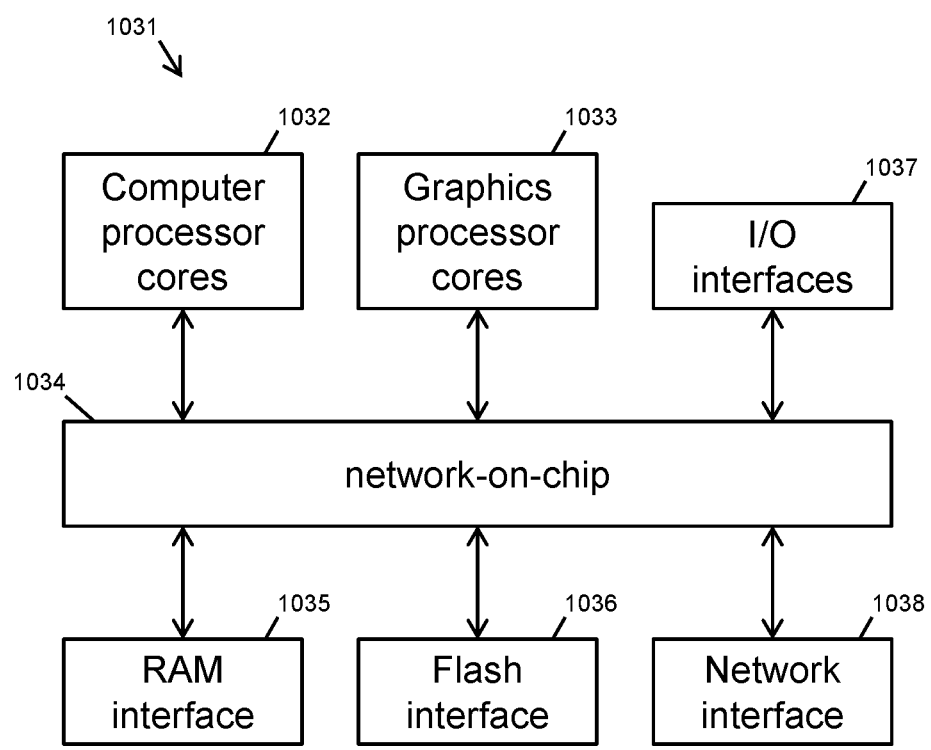
FIG. 10B shows a diagram of a system-on-chip according to one or more embodiments of the present subject matter.

FIG. 10B shows a block diagram of the system-on-chip 1031. It comprises a multicore cluster of CPU cores 1032 and a multicore cluster of GPU cores 1033. The processors connect through a network-on-chip 1034 to an off-chip dynamic random access memory (DRAM) interface 1035 for volatile program and data storage and a Flash interface 1036 for non-volatile storage of computer program code in a Flash RAM non-transitory computer readable medium. SoC 1031 may also have a display interface (not shown) for displaying a graphical user interface for functions such as displaying an ASR transcription to a user or displaying the results of a virtual assistant command and an I/O interface module 1037 for connecting to various I/O interface devices, as needed for different peripheral devices. The I/O interface enables sensors such as touch screen sensors, geolocation receivers, microphones, speakers, Bluetooth peripherals, and USB devices, such as keyboards and mice, among others. SoC 131 also comprises a network interface 1038 to allow the processors to access the Internet through wired or wireless connections such as WiFi, 3G, 4G long-term evolution (LTE), 5G, and other wireless interface standard radios as well as Ethernet connection hardware. By executing instructions stored in RAM devices through interface 1035 or Flash devices through interface 1036, the CPUs 1032 and GPUs 1033 perform steps of methods as described herein.

Program code, data, audio data, operating system code, and other necessary data are stored by non-transitory computer-readable media.

Figure 11:
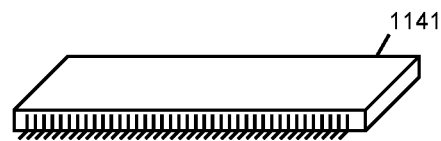
FIG. 11 shows a non-transitory computer-readable medium according to one or more embodiments of the present subject matter.

FIG. 11 shows an example computer readable medium 1141 that is a Flash random access memory (RAM) chip. Data centers commonly use Flash memory to store data and code for server processors. Mobile devices commonly use Flash memory to store data and code for processors within SoCs. Non-transitory computer readable medium 1141 stores code comprising instructions that, if executed by one or more computers, would cause the computers to perform steps of methods described herein. Other digital data storage media can be appropriate in various applications.

Examples shown and described use certain spoken languages. Various implementations operate, similarly, for other languages or combinations of languages. Some embodiments are screenless, such as an earpiece, which has no display screen. Some embodiments are stationary, such as a vending machine. Some embodiments are mobile, such as an automobile. Some embodiments are portable, such as a mobile phone. Some embodiments may be implanted in a human body. Some embodiments comprise manual interfaces such as keyboards or touchscreens. Some embodiments comprise neural interfaces that use human thoughts as a form of natural language expression.

Some embodiments function by running software on general-purpose CPUs such as ones with ARM or x86 architectures. Some implementations use arrays of GPUs.

Several aspects of one implementation of the speech-controlled interaction with a host device via a mobile phone are described. However, various implementations of the present subject matter provide numerous features including, complementing, supplementing, and/or replacing the features described above. In addition, the foregoing description, for purposes of explanation, used specific nomenclature to provide a thorough understanding of the embodiments of the invention. However, it will be apparent to one skilled in the art that the specific details are not required in order to practice the embodiments of the invention.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Practitioners skilled in the art will recognize many modifications and variations. Changes may be made in detail, especially matters of structure and management of parts within the principles of the embodiments of the present invention to the full extent indicated by the broad general meaning of the terms in which the appended claims are expressed.

Having disclosed exemplary embodiments and the best mode, modifications and variations may be made to the disclosed embodiments while remaining within the scope of the embodiments of the invention as defined by the following claims.

What is claimed is:

1. A computer-implemented method, comprising:
   receiving, at a session service provider, a pin request from a host device to generate a pin code;
   generating, by the session service provider, the pin code associated with the host device and the session service provider, wherein the pin code is displayed on the host device and further accessed by a mobile device;
   receiving, at the session service provider, a session request from the mobile device to interact with the host device, wherein the session request comprises at least identification information of the mobile device and the host device;
   generating, by the session service provider, a session ID at least based on the session request;
   transmitting, by the session service provider, the session ID to the host device and the mobile device; and
   managing, by the session service provider, a communication session associated with the session ID between the host device and the mobile device, wherein the host device is configured to receive a voice command from the mobile device.

2. The computer-implemented method of claim 1, wherein the session service provider is configured to manage the communication session by initiating, maintaining, and terminating the communication session between the host device and the mobile device.

3. The computer-implemented method of claim 1, further comprising:
   prior to receiving the session request, receiving, at the session service provider, a barcode request from the host device to generate a barcode associated with the host device and the session service provider; and
   generating the barcode by the session service provider, wherein the barcode is displayed on the host device and further accessed by the mobile device.

4. The computer-implemented method of claim 3, wherein the barcode at least comprises a bonding ID associated with the host device and access information of the session service provider.

5. The computer-implemented method of claim 1, wherein the session request is initiated when the mobile device and the host device are located within a predetermined distance.

6. The computer-implemented method of claim 1, wherein a speech recognition application in communication with the session service provider is configured to infer at least one semantic meaning of the voice command.

7. The computer-implemented method of claim 1, further comprising: inferring, using a speech recognition system subscribed to the session ID, at least one semantic meaning of the voice command;
   generating a query output in response to the voice command; and
   displaying the query output on at least one display associated with the host device and the mobile device.

8. The computer-implemented method of claim 1, further comprising: inferring, using a speech recognition system subscribed to the session ID, at least one semantic meaning of the voice command; and
   performing, by the host device, one or more actions based on the semantic meaning of the voice command.

9. The computer-implemented method of claim 1, wherein one or more host devices and mobile devices are subscribed to the session ID.

10. The computer-implemented method of claim 1, further comprising: terminating the communication session via one or more termination parameters.

11. A computer-implemented method, comprising:
    receiving, at a session service provider, a pin request from a host device to generate a pin code;
    generating, by the session service provider, the pin code associated with the host device and the session service provider, wherein the pin code encodes a bonding ID of the host device and access information of the session service provider, and wherein the pin code is displayed on the host device and further accessed by a mobile device;
    receiving, at the session service provider, a session request from the mobile device;
    generating, by the session service provider, a session ID at least partially based on the session request; and
    managing, by the session service provider, a communication session associated with the session ID between the host device and the mobile device.

12. The computer-implemented method of claim 11, wherein the session request comprises at least the bonding ID based on one or more parameters of the host device.

13. The computer-implemented method of claim 12, wherein the session request further comprises at least a mobile ID based on one or more parameters of the mobile device.

14. The computer-implemented method of claim 11, further comprising:
    transmitting, by the session service provider, the pin code to the host device;
    transmitting, by the session service provider, the session ID to the host device and the mobile device.

15. The computer-implemented method of claim 11, wherein the communication session enables a voice input from the mobile device to interact with the host device.

16. The computer-implemented method of claim 11, further comprising:
    inferring, using a speech recognition system subscribed to the session ID, at least one semantic meaning of the voice input;
    generating an output in response to the voice input; and
    displaying the output on at least one display associated with the host device and the mobile device.

17. The computer-implemented method of claim 11, further comprising: inferring, using a speech recognition system subscribed to the session ID, at least one semantic meaning of the voice input; and
    performing, by the host device, one or more actions based on the semantic meaning of the voice input.

18. A computer system, comprising:
    at least one processor; and
    memory including instructions that, when executed by the at least one processor, cause the computer system to:
    receive, at a session service provider, a pin request from a host device to generate a pin code;

generate, by the session service provider, the pin code associated with the host device and the session service provider, wherein the pin code is displayed on the host device and further accessed by a mobile device;

receive, at the session service provider, a session request from the mobile device to interact with the host device, wherein the session request comprises at least identification information of the mobile device and the host device;

generate, by the session service provider, a session ID at least based on the session request;

transmit, by the session service provider, the session ID to the host device and the mobile device; and manage, by the session service provider, a communication session associated with the session ID between the host device and the mobile device, wherein the mobile device is configured to interact with the host device during the communication session.

19. The computer system of claim 18, wherein the instructions when executed further cause the computer system to:
receive, at the session service provider, a barcode request from the host device to generate a barcode associated with the host device and the session service provider; and
generate the barcode by the session service provider, wherein the barcode is displayed on the host device and further accessed by the mobile device.

20. The computer system of claim 19, wherein the barcode at least comprises a bonding ID associated with the host device and access information of the session service provider.

21. The computer system of claim 18, wherein the instructions when executed further cause the computer system to:
inferring, using a speech recognition system subscribed to the session ID, at least one semantic meaning of a voice command for the host device;
generating a query output in response to the voice command; and
displaying the query output on at least one display associated with the host device and the mobile device.

22. The computer system of claim 18, wherein the instructions when executed further cause the computer system to:
inferring, using a speech recognition system subscribed to the session ID, at least one semantic meaning of a voice command for the host device; and
performing, by the host device, one or more actions based on the semantic meaning of the voice command.

23. The computer system of claim 18, wherein one or more host devices and mobile devices are subscribed to the session ID.

24. The computer system of claim 18, wherein the instructions when executed further cause the computer system to:
terminate the communication session via one or more termination parameters.

25. The computer system of claim 18, wherein the session service provider is configured to manage the communication session by initiating, maintaining, and terminating the communication session between the host device and the mobile device.

26. The computer system of claim 18, wherein the session request is initiated when the mobile device and the host device are located within a predetermined distance.

27. The computer system of claim 18, wherein a speech recognition application in communication with the session service provider is configured to infer at least one semantic meaning of the voice command.

* * * * *